A. E. BOSSÉ.
AMMONIA GENERATOR.
APPLICATION FILED MAR. 25, 1910.

1,014,040.

Patented Jan. 9, 1912.

Witnesses:
Percival N. Reed.
Mae Hofmann

Inventor:
Adolphe E. Bossé,
By Jas. C. Wolnsmith
Attorney.

UNITED STATES PATENT OFFICE.

ADOLPHE E. BOSSÉ, OF PITTSBURGH, PENNSYLVANIA, ASSIGNOR TO ACME REFRIGERATING COMPANY, A CORPORATION OF DELAWARE.

AMMONIA-GENERATOR.

1,014,040.  Specification of Letters Patent.  Patented Jan. 9, 1912.

Application filed March 25, 1910. Serial No. 551,439.

*To all whom it may concern:*

Be it known that I, ADOLPHE E. BOSSÉ, a citizen of the United States, residing at Pittsburgh, in the county of Allegheny and State of Pennsylvania, have invented certain new and useful Improvements in Ammonia-Generators, of which the following is a specification.

My invention relates to a generator for use in absorption refrigerating systems and in such connection it has particular relation to the construction and arrangement of a device for liberating and absorbing the ammonia gas of the aqua ammonia used in such refrigerating systems.

The object of my invention is to provide a simple and efficient device for use as a combined generator and absorber in ammonia absorption refrigerating systems.

My invention contemplates means for heating the aqua ammonia, as well as means for cooling said solution, contained within the same structure, whereby the generator may also act as an absorber thus obviating the necessity of a separate device for this purpose, to the end that the entire refrigerating system may be simplified.

The nature and characteristic features of my invention will be more readily understood from the following description taken in connection with the accompanying drawings forming part hereof, in which:—

Figure 1:
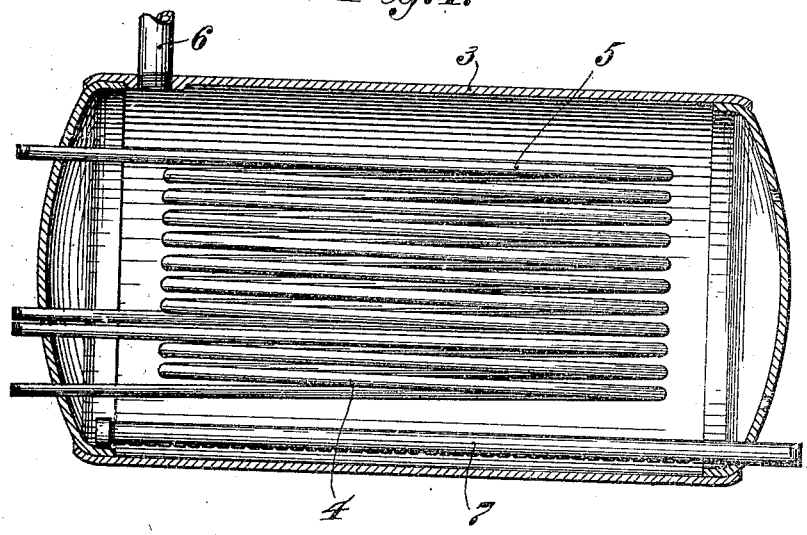
Figure 2:
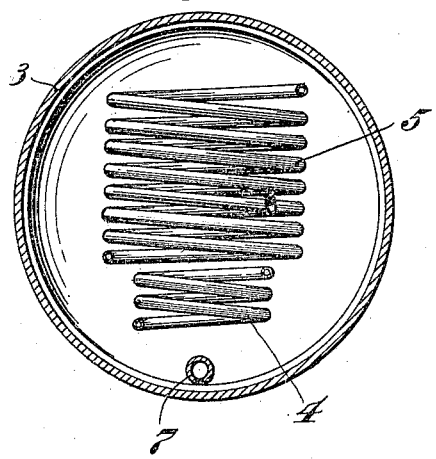

Figure 1 is a vertical longitudinal section of a generator and absorber embodying the main features of my present invention; and Fig. 2 is a transverse section thereof.

Referring to the drawings, 3 is the casing or shell of the generator and absorber, preferably of cylindrical shape with its longitudinal axis arranged horizontally.

4 is a coil of pipe arranged below the central axis of the casing through which steam or any other heating agent may be passed to thereby heat the contained liquor and thus drive off the ammonia gas at the proper time in the use of the apparatus.

5 is a coil of pipe arranged above the steam coil 4 through which water or any other cooling agent may be circulated to reduce the temperature of the contained liquor at the proper time in the operation of the apparatus.

6 is an outlet pipe for the passage of the liberated ammonia gas into the refrigerating system, said pipe 6 communicating with the interior of the casing 3 at the top thereof.

7 is the inlet pipe for the return of the used ammonia gas from the refrigerating system, which pipe 7 is preferably perforated along its under surface to more thoroughly distribute the ammonia gas as the same returns to the generator and absorber to be reabsorbed by the liquor contained therein.

It should be noted that the steam coil 4 is so located below the central axis of the generator as to be at all times submerged beneath the surface of the contained liquor notwithstanding the diminution in volume of said liquor as the ammonia gas is driven off therefrom.

The operation of the device is as follows: Starting with the aqua ammonia contained within the generator in its condition of greatest strength, steam is admitted to the coil 4 whereby the aqua ammonia will be heated and the gas driven off therefrom. The gas passes from the generator 3 through the pipe 6 into the condenser of the refrigerating system wherein it is first cooled to be thereby liquefied while retaining the pressure due to the high temperature of the liquor contained within the generator 3. As is well known in the art the liquefied ammonia may be collected in a suitable container or receiver from which, at the proper time, it may be permitted to pass through an expansion valve into the cooling coils of the refrigerating system. It should be understood that the driving off of the ammonia gas from the aqua ammonia contained within the generator 3 occurs in a certain period in the cycle of operations and that the expansion of the liquefied ammonia occurs in another period of the cycle of operations during which latter period the ammonia gas which has expanded and thereby lost its pressure is returned to the generator 3 by means of the perforated return pipe 7 arranged in the bottom of said generator.

It should be noted that by making the casing or shell 3 of the generator cylindrical in shape with its longitudinal axis arranged horizontally and by superposing the cooling coil over the heating coil in the manner shown and described, the heating coil will at all times be submerged notwithstanding the changes in volume of the contained liquor as the ammonia gas is periodically driven off and reabsorbed, so that the heat from the steam passing through the heating coil will be conserved to the fullest extent. Furthermore by the central arrangement of the cooling coil, the same will be located at the place of greatest horizontal width of the generator and consequently may be made of such size as to adequately effect the cooling of the liquor while the absorption is taking place; it being understood that the portion of said cooling coil which may extend above the level of the contained liquor will in no wise interfere with the absorption operation.

Having thus described the nature and characteristic features of my invention what I claim as new and desire to secure by Letters Patent is:—

1. An ammonia generator comprising a cylindrical casing arranged with its longitudinal axis horizontal, a cooling coil centrally arranged within said casing, and a heating coil arranged beneath said cooling coil in the lower part of said casing.

2. An ammonia generator comprising a cylindrical casing arranged with its longitudinal axis horizontal, a cooling coil centrally arranged within said casing, a heating coil arranged beneath said cooling coil in the lower part of said casing, an outlet pipe communicating with the upper part of said casing, and an inlet for the ammonia gas at the lower part of the said casing.

In testimony whereof I have hereunto signed my name in the presence of two witnesses.

ADOLPHE E. BOSSÉ.

Witnesses:
T. E. REUTOR, Jr.,
W. D. McBRYAR.